Jan. 23, 1923.
C. M. ROBINSON.
SEPARABLE FASTENER.
FILED JUNE 19, 1922.
1,443,277
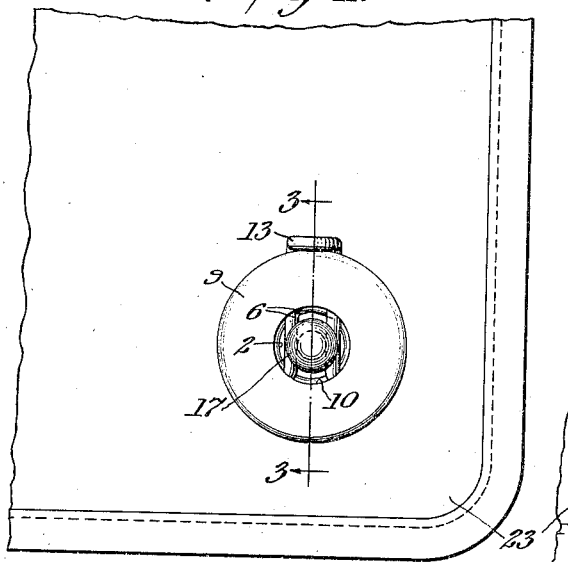
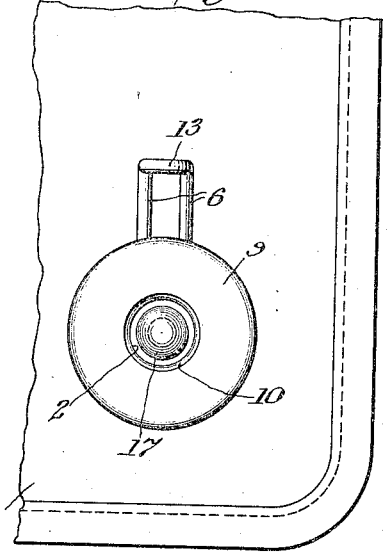
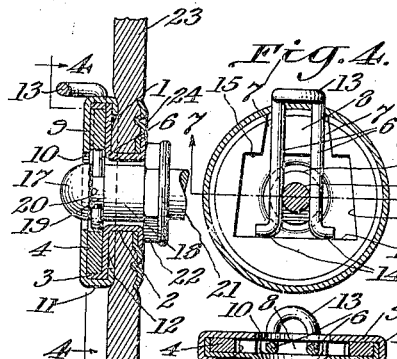
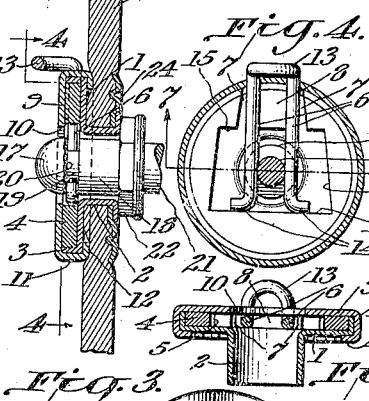
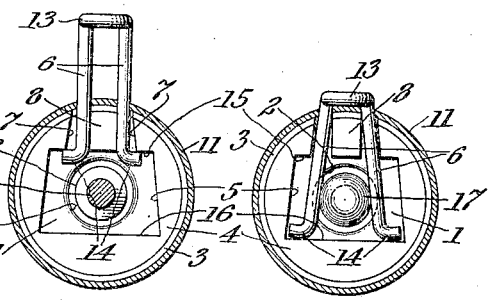
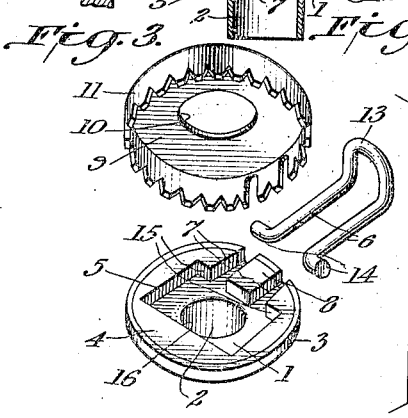
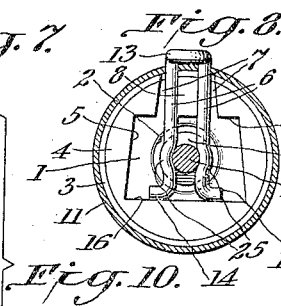
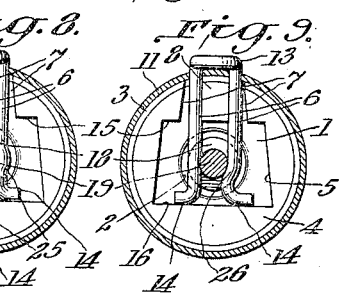
Inventor:
Charles M. Robinson
by
W. K. Finckel
Attorney.

Patented Jan. 23, 1923.

1,443,277

UNITED STATES PATENT OFFICE.

CHARLES M. ROBINSON, OF WATERBURY, CONNECTICUT, ASSIGNOR TO SCOVILL MANUFACTURING COMPANY, OF WATERBURY, CONNECTICUT, A CORPORATION OF CONNECTICUT.

SEPARABLE FASTENER.

Application filed June 19, 1922. Serial No. 569,223.

*To all whom it may concern:*

Be it known that I, CHARLES M. ROBINSON, a citizen of the United States, residing at Waterbury, in the county of New Haven and State of Connecticut, have invented a certain new and useful Improvement in Separable Fasteners, of which the following is a full, clear, and exact description.

This invention relates to separable fasteners of the stud and socket type, and although the principle of the invention lends itself to fasteners for a variety of purposes, it is herein shown and described as adapted particularly to separable fasteners for carriage or automobile curtains and the like.

The object of the invention is to provide a separable fastener of simple and cheap construction, and having few parts, all of which are of rugged and durable construction, and hence not apt to become broken or inoperative during the ordinary continued and rough usage to which such fasteners are subjected.

The invention consists in a separable fastener having a socket member comprising a back plate and a face plate and a slidable resilient stud-engaging member mounted therebetween, and a stud having a head, a shank and a neck underlying said head, the stud engaging member adapted to engage the stud at its neck, as I will proceed now to explain and finally claim.

In the accompanying drawings illustrating the invention, in the several figures of which like parts are similarly designated, Figure 1 is a face view showing the fastener mounted upon a portion of a carriage curtain or the like, with its stud-engaging member in stud engaging position. Fig. 2 is a view similar to Fig. 1, but showing the stud-engaging member disengaged from the stud. Fig. 3 is a section through the socket member taken in the plane of line 3—3, Fig. 1, the stud being shown in elevation. Fig. 4 is a section taken in the plane of line 4—4, Fig. 3. Fig. 5 is a section similar to Fig. 4, but showing the stud-engaging member in disengaged position, as in Fig. 2. Fig. 6 is a sectional view similar to Fig. 4, but showing the parts in the positions assumed when the socket member is being forced upon the stud head. Fig. 7 is a section taken in the plane of line 7—7, Fig. 4. Figs. 8 and 9 show modifications of the stud engaging member whereby its frictional engagement with the neck of the stud is augmented. Fig. 10 shows in perspective the parts of the socket member disassembled.

The socket member comprises essentially a back plate 1, having a setting eyelet 2, preferably integral therewith and providing an aperture in the back plate, and an upturned flange 3. Upon the back plate is mounted a filler block 4 cut out as at 5 to form a working space for the resilient arms 6 of the stud-engaging member, and having grooves 7 in which these arms are adapted to slide, and a guide 8 to keep the stud-engaging member properly alined for engagement with the stud. As shown, the filler block and stud-engaging member are assembled upon the back plate and within its flange 3 by means of a face plate 9 provided with an aperture 10 and a flange 11 which is closed over and clinched upon the back of the back plate, as at 12, but obviously other suitable ways of uniting these parts may be employed. The stud-engaging member is provided with an operating extension 13 projecting exteriorly of the socket member.

It will be noted that the filler block 4 is of greater thickness than the thickness of the stud-engaging member, thereby providing a slight clearance between the stud-engaging member and the back and face plates, whereby jamming of the stud-engaging member between the back and face plates during the operation of assembling, and thereafter during operation, is prevented, and free sliding movement thereof ensured.

The resilient arms 6 of the stud-engaging member are deflected as at 14 to form stops adapted to abut against the upper face 15 of the cut-out portion of the filler block to limit the outward movement of the stud-engaging member with respect thereto and prevent its withdrawal from the socket member, and these stops also serve to limit the inward motion of the stud-engaging member by their contact with the lower face 16 of the cut-out portion of the filler block.

The stud of the fastener comprises a head 17, a shank 18 and a neck 19 of reduced diameter, whereby the head provides an abrupt overhanging shoulder 20. In the drawing I have shown a stud designed for use with a carriage curtain fastener, wherein the stud proper is mounted upon a screw shank 21 (broken away) provided with a hexagonal head 22 by which it may be driven into the part to which the curtain is to be fastened, but other means of attaching the stud may be used to suit other conditions.

The socket member of the fastener may be attached to a carriage curtain or the like 23 by means of a washer 24 upon which the end of the eyelet 2, which passes through the material of the curtain, may be clinched, as shown in Fig. 3.

The operation of the fastener is as follows: When it is desired to attach the socket member to the stud, assuming that the parts of the socket member are in the position shown in Fig. 4, it is merely necessary to position the socket member with its apertures arranged substantially axially of the stud, and then exert pressure upon the socket member toward the stud, which pressure will cause the head of the stud to force apart or deflect the resilient arms 6 of the stud-engaging member substantially radially of the aperture, as shown in Fig. 6, until the head extends past them, whereupon they will, by their resilient action, return to their normal position (as shown in Figs. 1 and 4) beneath the shoulder 20 of the head of the stud and in frictional engagement with the guide 8 and the neck 19 of the stud. It will thus be seen that disengagement of the socket member from the stud will be impossible so long as the stud-engaging member remains in this position, and the frictional engagement of the arms 6 of the stud engaging member with the neck 19 and guide 8 will prevent accidental displacement of it outwardly. When it is desired to disengage the socket member from the stud, the stud-engaging member will be withdrawn to the position shown in Figs. 2 and 5 by means of the operating extension 13, which will completely withdraw the arms 6 of the stud-engaging member from their position in intersecting relation to the aperture of the socket member and will permit the socket member to be detached from the stud.

It may and sometimes does occur that in separable fasteners in which a resilient member is used for engaging the stud, continued use and operation will cause the resilient member to lose its resiliency to some extent, and as a means of preventing this loss of resiliency from impairing the utility of this fastener, the arms 6 of the stud-engaging member instead of being made straight, as shown in Figs. 1 to 7 and 10, may be provided with bent portions 25 as shown in Fig. 8, for partially embracing the neck 19 of the stud to augment the frictional engagement of the arms therewith and prevent accidental withdrawal of the stud-engaging member, or only one of the arms may be so formed for this purpose as shown at 26, Fig. 9.

It will thus be seen that I provide a fastener which is very simple, both in construction and mode of operation, and which is not likely to become damaged or impaired in its usefulness, and, moreover, the stud-engaging member of the fastener is of such a nature that when once it has engaged the stud when in the position shown in Fig. 4, it is impossible for it to become accidentally separated therefrom, and may only be so separated therefrom when the stud-engaging member is withdrawn as hereinabove described.

I am aware that fasteners have been devised in which a resilient stud-engaging member has been employed, but in those fasteners of this type with which I am familiar, either the stud-engaging member is fixed and the socket member is forced on to the stud and released therefrom by resilient deflection of the stud-engaging member, in which case the head of the stud must be substantially a double cone, which has its disadvantages in that the socket member may become as easily detached as attached; or sliding movement of the stud-engaging member is necessary for both the attaching and detaching of the socket member to and from the stud respectively.

It will be obvious that my fastener embodies advantages over both of these types in that it may be snapped into attached position over the head of the stud when the arms of the stud-engaging member lie in such position as to intersect the aperture of the socket member and cannot be accidentally detached by similar pressure in the opposite direction because of the shoulder of the stud head; and in that withdrawal of the stud-engaging member is necessary only to disengage the socket member from the stud and is not necessary for the purpose of engaging it therewith.

It is to be understood that although I have herein shown and described a particular embodiment of my invention, I do not consider it as limited thereto except as defined by the scope of the following claims.

What I claim is:—

1. A socket member for separable fasteners, comprising a back plate, a face plate, and a bodily slidable resilient stud-engaging member mounted therebetween, said socket member adapted to be engaged with a stud by resilient snap action of the stud-engaging member and to be disengaged by sliding movement of the stud-engaging member.

2. A socket member for separable fasteners, comprising a back plate, a face plate, a slidable resilient stud-engaging member mounted therebetween, and a filler block forming a guide for said stud-engaging member.

3. A socket member for separable fasteners, comprising a back plate, a face plate, and a bodily slidable resilient stud-engaging member mounted therebetween and provided with an operating extension projecting exteriorly of said back and face plates, said socket member adapted to be engaged with a stud by resilient snap action of the stud-engaging member and to be disengaged by sliding movement of the stud-engaging member.

4. A socket member for separable fasteners, comprising a back plate, a face plate, and a bodily slidable resilient stud-engaging member mounted therebetween, said face plate and back plate being complementally formed to assemble them and the stud-engaging member between them, said socket member adapted to be engaged with a stud by resilient snap action of the stud-engaging member and to be disengaged by sliding movement of the stud-engaging member.

5. A socket member for separable fasteners, comprising an apertured back plate, an apertured face plate, and a bodily slidable stud-engaging member having a pair of resilient arms intersecting the apertures of said plates and lying therebetween and capable of deflection substantially radially of said apertures to admit the head of a stud.

6. A socket member for separable fasteners, comprising an apertured back plate, an apertured face plate, and a slidable stud engaging member having a pair of resilient arms intersecting the apertures of said plates and assembled therebetween, said arms capable of deflection substantially radially of said apertures to admit the head of a stud, and slidable out of intersecting relation to said apertures to release said stud.

7. A socket member for separable fasteners, comprising an apertured back plate, an apertured face plate, a slidable resilient stud-engaging member, and a filler block assembled between said back and face plates and provided with a cut-out portion adjacent to the apertures of said back and face plates and providing a working space for said stud-engaging member, said filler block having grooves forming guides for said stud-engaging member.

8. A socket member for separable fasteners, comprising a back plate, a face plate, a slidable stud-engaging member having a pair of resilient arms, and a filler block having a cut-out portion providing a working space for said arms and grooves forming guides therefor.

9. A socket member for separable fasteners, comprising an apertured back plate, and a face plate, a slidable stud-engaging member having resilient arms normally intersecting the aperture of said back plate, and a filler block mounted between said back and face plates and provided with grooves forming guides for said arms to maintain them in operative alinement with said aperture.

10. In a separable fastener, a socket member comprising a back plate, a face plate, and a bodily slidable resilient stud-engaging member assembled therebetween, and a stud having a head, a shank and a neck underlying said head, said stud-engaging member adapted to engage the neck of said stud by snap action and to be disengaged therefrom by sliding movement.

11. In a separable fastener, a socket member comprising an apertured back plate, an apertured face plate, and a slidable stud-engaging member having a pair of resilient arms intersecting the apertures of said plates and assembled therebetween, and a stud having a head, a shank, and a neck underlying said head, said resilient arms capable of deflection substantially radially of said apertures when forced against said head and adapted to embrace said neck after the passage of said head therebetween, said stud-engaging member being slidable so as to withdraw its arms from cooperation with said stud to release said stud from said socket member.

12. In a separable fastener, a socket member comprising a back plate, a face plate, and a bodily slidable stud engaging member mounted therebetween and having a pair of resilient arms, a stud having a head, a shank and a neck underlying said head, said arms adapted to snap over said head and to frictionally engage said neck to prevent accidental sliding movement of said stud-engaging member, and means for positively sliding said stud-engaging member to disengage said arms from said stud.

13. A socket member for separable fasteners, comprising a back plate, a face plate, a bodily slidable resilient stud-engaging member mounted therebetween, and means within said socket member and cooperating with said stud-engaging member for positioning and guiding said stud-engaging member, said socket member adapted to engage a stud by snap action of said stud-engaging member and to be disengaged therefrom by bodily sliding movement of said stud-engaging member.

In testimony whereof I have hereunto set my hand this 16th day of June A. D. 1922.

CHARLES M. ROBINSON.

Witnesses:
PERCY WARNER,
H. B. RIGGS.